United States Patent
Bohlin

(10) Patent No.: US 11,913,662 B2
(45) Date of Patent: Feb. 27, 2024

(54) TEMPERATURE CONTROLLER FOR A TEMPERATURE CONTROL MECHANISM PREVENTING CONDENSATION

(71) Applicant: SENSEAIR AB, Delsbo (SE)

(72) Inventor: Gustav Bohlin, Delsbo (SE)

(73) Assignee: Senseair AB, Delsbo (SE)

( * ) Notice: Subject to any disclaimer, the term of this patent is extended or adjusted under 35 U.S.C. 154(b) by 0 days.

(21) Appl. No.: 18/249,363

(22) PCT Filed: Oct. 18, 2021

(86) PCT No.: PCT/SE2021/051026
§ 371 (c)(1),
(2) Date: Apr. 17, 2023

(87) PCT Pub. No.: WO2022/086401
PCT Pub. Date: Apr. 28, 2022

(65) Prior Publication Data
US 2023/0288091 A1    Sep. 14, 2023

(30) Foreign Application Priority Data
Oct. 21, 2020 (SE) .................... 2051229-9

(51) Int. Cl.
*F24F 11/63* (2018.01)
*G05B 19/4155* (2006.01)

(52) U.S. Cl.
CPC .......... *F24F 11/63* (2018.01); *G05B 19/4155* (2013.01); *G05B 2219/50333* (2013.01)

(58) Field of Classification Search
CPC ....... F24F 11/63; F24F 11/30; G05B 19/4155; G05B 2219/50333; F25B 49/02; G01N 25/68; F25D 21/04
See application file for complete search history.

(56) References Cited

U.S. PATENT DOCUMENTS

| 3,665,748 A | 5/1972 | Mator |
| 5,429,805 A | 7/1995 | Uno et al. |

(Continued)

FOREIGN PATENT DOCUMENTS

| CH | 712528 A2 | 12/2017 |
| CN | 1228839 A | 9/1999 |

(Continued)

OTHER PUBLICATIONS

Ruano, A.E., Crispim, E.M., Conceicao, E.Z. and Lúcio, M.M.J., 2006. Prediction of building's temperature using neural networks models. Energy and Buildings, 38(6), pp. 682-694. (Year: 2006).*

(Continued)

*Primary Examiner* — Alicia M. Choi
(74) *Attorney, Agent, or Firm* — Knobbe, Martens, Olson & Bear, LLP

(57) ABSTRACT

A temperature controller (1) for a temperature control mechanism (M) arranged for heating of a device (2) is described. The temperature controller (1), includes an input (3) for a temperature signal (Y), an output (4) for a control signal U for controlling the temperature controller, and a first control loop mechanism (CLM1) can output a first predicted temperature ($\tilde{X}$) of the gas surrounding the device. The temperature controller also includes a first model ($\tilde{S}$) of the thermal properties of the device, a second model ($\tilde{M}$) of the thermal properties of the device, and a second control loop mechanism (CLM2) can output the control signal (U). The input (5) of the first control loop mechanism (CLM1) is provided with the temperature signal (Y) from which the modelled temperature ($\tilde{Y}_1$) and the modelled first temperature effect ($\tilde{Y}_2$) have been subtracted, and the input (5) of the second control loop mechanism (CLM2) is provided with the difference between the first predicted temperature ($\tilde{X}$) of (Continued)

the gas surrounding the device and the temperature signal (Y).

14 Claims, 3 Drawing Sheets

(56) References Cited

U.S. PATENT DOCUMENTS

| | | | |
|---|---|---|---|
| 5,728,927 | A | 3/1998 | Ong |
| 5,731,508 | A | 3/1998 | Slemeyer |
| 6,373,033 | B1 * | 4/2002 | de Waard ............. G05B 13/048 |
| | | | 219/486 |
| 6,883,651 | B2 | 4/2005 | Fukaya |
| 6,944,566 | B2 | 9/2005 | Chen et al. |
| 7,736,903 | B2 | 6/2010 | Lambert et al. |
| 7,845,206 | B2 | 12/2010 | Wohltjen |
| 7,966,104 | B2 | 6/2011 | Srivastava et al. |
| 9,846,117 | B2 | 12/2017 | Zhou et al. |
| 9,927,356 | B2 | 3/2018 | Skibo |
| 10,113,957 | B1 | 10/2018 | Yi et al. |
| 10,114,432 | B2 | 10/2018 | Peng et al. |
| 2003/0109795 | A1 | 6/2003 | Weber |
| 2006/0047445 | A1 | 3/2006 | Williams et al. |
| 2006/0144061 | A1 | 7/2006 | Badenhorst et al. |
| 2009/0039267 | A1 | 2/2009 | Arndt et al. |
| 2009/0235720 | A1 | 9/2009 | Smith |
| 2010/0188232 | A1 | 7/2010 | Lambert et al. |
| 2011/0107813 | A1 | 5/2011 | Guth et al. |
| 2011/0213749 | A1 | 9/2011 | Pichon |
| 2012/0078532 | A1 | 3/2012 | Forsyth et al. |
| 2014/0026149 | A1 | 1/2014 | Backensto et al. |
| 2015/0241359 | A1 | 8/2015 | Haveri et al. |
| 2015/0373285 | A1 | 12/2015 | Morris et al. |
| 2016/0025404 | A1 * | 1/2016 | Zheng .................... F25D 21/04 |
| | | | 62/154 |
| 2016/0187897 | A1 | 6/2016 | Peng et al. |
| 2017/0254737 | A1 | 9/2017 | Ke et al. |
| 2018/0081330 | A1 * | 3/2018 | Haslett ................ H04L 12/2816 |
| 2018/0095028 | A1 | 4/2018 | Jourdainne |
| 2018/0120222 | A1 | 5/2018 | Fritz et al. |
| 2018/0120223 | A1 | 5/2018 | Marta et al. |
| 2018/0156766 | A1 | 6/2018 | Zeng et al. |
| 2018/0252699 | A1 | 9/2018 | Dang |
| 2019/0072489 | A1 | 3/2019 | Camargo et al. |
| 2019/0078801 | A1 * | 3/2019 | Turney ..................... F24F 11/89 |
| 2020/0041158 | A1 | 2/2020 | Turney et al. |
| 2020/0346518 | A1 | 11/2020 | Deliwala |
| 2021/0041127 | A1 * | 2/2021 | Risbeck .................. F24F 11/62 |
| 2022/0034568 | A1 * | 2/2022 | Satou ...................... F25B 41/20 |
| 2022/0092241 | A1 * | 3/2022 | Moradian ......... H01L 21/67017 |
| 2023/0117008 | A1 | 4/2023 | Martin |
| 2023/0236120 | A1 | 7/2023 | You et al. |
| 2023/0236168 | A1 | 7/2023 | Granstam et al. |
| 2023/0304924 | A1 | 9/2023 | Rödjegård |

FOREIGN PATENT DOCUMENTS

| | | | |
|---|---|---|---|
| CN | 1836154 | A | 9/2006 |
| CN | 101027615 | A | 8/2007 |
| CN | 101449143 | A | 6/2009 |
| CN | 102803936 | A | 11/2012 |
| CN | 105319176 | A | 2/2016 |
| CN | 105021777 | B | 8/2016 |
| CN | 106645587 | A | 5/2017 |
| CN | 107917484 | A | 4/2018 |
| CN | 108001221 | A | 5/2018 |
| CN | 108279719 | A | 7/2018 |
| CN | 108762086 | A | 11/2018 |
| EP | 2784485 | A1 | 10/2014 |
| GB | 2395259 | A | 5/2004 |
| GB | 2457660 | A | 8/2009 |
| JP | 2010210232 | A * | 9/2010 ........... C08G 77/485 |
| JP | 2021006755 | A * | 1/2021 ............. F24F 13/22 |
| KR | 10-2016-0112213 | A | 9/2016 |
| KR | 101720944 | B1 | 4/2017 |
| KR | 10-2019-0074506 | A | 6/2019 |
| SE | 531741 | C2 | 7/2009 |
| SE | 1950840 | | 1/2021 |
| WO | WO 1998/09152 | A1 | 3/1998 |
| WO | WO 2006/029920 | A1 | 3/2006 |
| WO | WO 2007/091043 | A1 | 8/2007 |
| WO | WO 2012/166585 | A2 | 12/2012 |
| WO | WO 2016/020422 | A1 | 2/2016 |
| WO | WO 2017/162917 | A1 | 9/2017 |
| WO | WO 2017/164953 | A1 | 9/2017 |
| WO | WO 2018/038491 | A1 | 2/2018 |
| WO | WO 2019/115473 | A1 | 6/2019 |
| WO | WO 2021/002796 | A1 | 1/2021 |

OTHER PUBLICATIONS

International Search Report / Written Opinion on PCT/SE2021/051026 dated Jan. 18, 2022 in 10 pages.
International Search Report and Written Opinion in PCT/SE2021/050119 dated Apr. 20, 2021 in 13 pages.
International Search Report and Written Opinion in PCT/SE2021/050647 dated Sep. 27, 2021 in 10 pages.
International Search Report and Written Opinion in PCT/SE2021/050841 dated Nov. 16, 2021 in 10 pages.
International Search Report and Written Opinion in PCT/SE2021/051148 dated Aug. 12, 2021 in 10 pages.
International Search Report and Written Opinion in PCT/SE2021/051308 dated Feb. 17, 2022.
Office Action for Chinese Application No. 202180016930.4 dated Mar. 18, 2023 with translation in 17 pages.
Cited Provisions from Office Action for Chinese Application No. 202180016930.4 dated Mar. 18, 2023 in 1 page.
Cheng, et al., A New Distance Measure of Belief Function in Evidence Theory, IEEE Access, vol. 7, pp. 68607-68617, 2019.
Dong, et al., A Novel Multi-Criteria Discounting Combination Approach for Multi-Sensor Fusion, IEEE Sensors Journal, vol. 19, No. 20, pp. 9411-9421, 2019.
Hodgkinson et al., "Optical gas sensing: a review", Topical Review, Measurement Science and Technology, vol. 24 No. 1, pp. 1-95, 2013. doi: 10.1088/0957-0233/24/1/012004; figure 15; Section 4.
Ljungblad "High Performance breath alcohol analysis" Malardalen University Press Dissertations No. 240, 2017.
Wu et al., Sensor fusion Using Dempster-Shafer Theory, IEEE Instrumentation and Measurement, Technology Conference, pp. 7-12, 2002.
Wu et al., Sensor Fusion Using Dempster-Shafer Theory II: Static Weighting and Kalman Filter-like Dynamic Weighting, Instrumentation and Measurement, Technology Conference, pp. 907-912, 2003.
T. Wiezbicki and E. P. Ribeiro, "Sensor drift compensation using weighted neural networks," 2016 IEEE Conference on Evolving and Adaptive Intelligent Systems (EAIS), 2016, pp. 92-97, doi: 10.1109/EAIS.2016.7502497. ; whole document.
Yang, et al., A new distance based total uncertainty measure in the theory of belief functions, Knowledge Based Systems 94, pp. 114-123, 2016.
Yong, et al., Combining belief functions based on distance of evidence, Decision Support Systems, 38, pp. 489-493, 2004.
Zhang, et al., Novel Algorithm for Identifying and Fusing Conflicting Data in Wireless Sensor Networks, Sensors, 14, pp. 9562-9581, 2014.
Vaisala, Vaisala CARBOCAP® Technology for demanding environments, https://www.vaisala.com/en/vaisala-carbocapr-technology-demanding-environments.

\* cited by examiner

Prior art

TEMPERATURE CONTROLLER FOR A TEMPERATURE CONTROL MECHANISM PREVENTING CONDENSATION

TECHNICAL FIELD

The present invention relates to a method and a temperature controller for controlling a temperature control mechanism for heating of a device in order to suppress condensation on a surface of the device.

BACKGROUND ART

Condensation and frost is a problem in a variety of applications such as, e.g., electronic enclosures, vehicle windscreens, eyewear, goggles, helmet visor, computer monitors, windows, etc.

Condensation can only happen at surfaces that are below the dew point temperature of the surrounding gas. U.S. Pat. No. 6,886,351B1 describes a device and a method for sensing condensation conditions and for preventing and removing condensation from surfaces. The described device and method utilizes two thermal sensors and one humidity sensor to determine if the physical conditions necessary for condensation are present. If condensation is detected, suppression mechanisms can be activated. A first thermal sensor measures the temperature of a surface that is to be protected from condensate. A second thermal sensor together with a humidity sensor in an environment separated from the surface are used to determine the dew point temperature of the surrounding gas. If the surface temperature is below the dew point, a circuit causes a condensation suppression mechanism to be activated for preventing or removing condensate at the surface.

A problem with systems for preventing condensation and frost on a surface of a device of the prior art is that such systems rely on multiple sensors. Another problem with the present systems is that humidity sensors are expensive.

SUMMARY OF THE INVENTION

An object of the present invention is to provide a method and a temperature controller for a temperature control mechanism, which temperature control mechanism is arranged for heating of a device, which method and temperature controller enables detection of condensation and frost conditions and suppression of condensation and frost from surfaces of the device, and which method and temperature controller is less complex than controllers of the prior art.

Another object of the present invention is to provide a temperature controller for a temperature control mechanism, which temperature control mechanism is arranged for heating of a device, which method and temperature controller enables detection of condensation and frost conditions and suppression of condensation and frost from surfaces, and which method and temperature controller dispense with the need for a humidity sensor.

At least one of these objects is fulfilled with a temperature controller or a computer implemented method according to the independent claims.

Further advantages are provided with the features of the dependent claims.

According to a first aspect of the present invention a temperature controller is provided for a temperature control mechanism, which temperature control mechanism is arranged for heating of a device. The temperature controller comprises an input for a temperature signal, which is a measured temperature of the device, an output for a control signal for controlling the temperature controller, and a first control loop mechanism, comprising an input and an output, wherein the first control loop mechanism is configured to output a first predicted temperature of the gas surrounding the device. The temperature controller also comprises a first model of the thermal properties of the device, which is configured to output a modelled temperature of the device based on the first predicted temperature of the gas surrounding the device, a second model of the thermal properties of the device, which predicts a modelled first temperature effect of the temperature controller on the device based on the control signal, and a second control loop mechanism, comprising an input and an output, wherein the second control loop mechanism is configured to output the control signal, wherein the input of the first control loop mechanism is provided with the temperature signal from which the modelled temperature and the modelled first temperature effect have been subtracted, and wherein the input of the second control loop mechanism is provided with the difference between the first predicted temperature of the gas surrounding the device and the temperature signal.

With the temperature controller according to the first aspect of the invention condensation and frost can be mitigated through use of the controller. The implementation is more cost effective than other similar solutions as only a single temperature sensor is needed. There is no need for a humidity sensor. The temperature controller according to the first aspect may be used for handling condensation and frost in many different kinds of applications such as, e.g., electronic enclosures, vehicle windscreens, eyewear, goggles, helmet visor, computer monitors, windows, etc. The invention also offers great flexibility. Many different kinds of temperature control mechanisms can be used to comply to many different kinds of performance and cost requirements. Lastly, temperature control is only needed when the environment's temperature increases, which limits the power-consumption of the system.

As known to persons skilled in the art, a model of the thermal properties of a device mimics the thermal behaviour of the device it is modelling, i.e., the modelled output of the model should be similar to the behaviour of the device. An important fact is that the effects of the temperature control mechanism and the activity level of the system can be modelled and then compensated for internally by the controller when it predicts the surrounding gas temperature. This is what removes the need for additional measurements or inputs.

Another important fact is that the models may be realized in many different forms, both through physical models, e.g., circuits, thermoelectrical or thermomechanical devices or through computer models. Any system, simulation or model which behaves mathematically similar to the system of interest, i.e., which has approximately the same transfer function can be used as internal models in the controller.

At least one of the first control loop mechanism and the second control loop mechanism, may be implemented as a, proportional—integral—derivative, PID, controller. As is well known for the skilled person, a PID controller is configured to minimize the signal on the input, i.e., the signal on the input of the first control loop mechanism and/or the signal on the input of the second control loop mechanism.

At least one of the P, I, and D-terms of a PID controller may be zero. This decreases the complexity of adjusting the terms of the PID controller.

At least one of the control loop mechanisms may be implemented as a fuzzy logic controller.

Similarly to when at least one of the control loop mechanisms is implemented as a PID controller, the at least one control loop mechanism implemented as a fuzzy logic controller is configured to minimize the signal on the input, i.e., the signal on the input of the first control loop mechanism and/or the signal on the input of the second control loop mechanism.

At least one of the control loop mechanisms may be implemented as a machine-learning controller. As is known to the person skilled in the art control loop mechanisms implemented as machine learning controllers are configured to minimize the signal on the input, i.e., the signal on the input of the first control loop mechanism and/or the signal on the input of the second control loop mechanism.

Thus, irrespective of the type of control loop mechanism, the first control loop mechanism and the second control loop mechanism are configured to minimize the signal on their respective inputs.

The first model of the thermal properties of the device, which is configured to output a modelled temperature of the device based on the first predicted temperature of the gas surrounding the device, may be modelled through a computer model. A computer model is uncomplicated to implement but may have to be used for more than one device to be cost efficient.

The first model of the thermal properties of the device, which is configured to output a modelled temperature of the device based on the first predicted temperature of the gas surrounding the device, may be modelled through a physical model, e.g., an electrical circuit, a thermomechanical system or a thermoelectrical system. A physical model may be cheaper to implement than a computer model.

The second model of the thermal properties of the device, which predicts a modelled first temperature effect of the temperature controller on the device based on the control signal, may be modelled through a computer model. As mentioned above, a computer model is uncomplicated to implement but may have to be used for more than one device to be cost efficient.

The second model of the thermal properties of the device, which predicts a modelled first temperature effect of the temperature controller on the device based on the control signal, may be modelled through a physical model, e.g., an electrical circuit, a thermomechanical system or a thermoelectrical system. A physical model may be cheaper to implement than a computer model.

The temperature controller may comprise a second input for an activity signal of the device, and a third model of the device, which predicts a modelled second temperature effect of the device activity on the device itself based on the activity signal, wherein the input to the first control loop mechanism is provided with the temperature signal from which the modelled temperature, the modelled first temperature effect and the modelled second temperature effect have been subtracted. By taking into account also the effect of the activity of the device itself, the control of the temperature of the device is further improved, thereby minimizing the risk for frost and condensation on the device.

The temperature controller may comprise a computer, which executes a program for implementing the temperature controller as a computer model on the computer. Such a solution is easy to implement but in order to be cost efficient the computer should not be dedicated to the program for implementing the temperature controller.

The first, second and third models may be implemented as first-order transfer functions. To define such first order models, one may exposes the system, without the controller, to a step change in the input and measure the response. This may be done by measuring the time Tau to reach 63.2% of the change in output. One time constant will be measured for each model. For the first model, this means changing the environment temperature and measuring the change in system temperature. For the second model, this means changing the heater control signal and measuring the change in system temperature. For the third model, this means changing the activity signal, such as the system input current, excluding the heater.

Thus, the different models may defined as first order transfer functions, wherein the time constant for each model is determined by measurement of the step response for the corresponding system that is modelled.

The models should be first-order systems with these time constants Tau. The most likely implementations of the models are as computer models. There are many different computer models that behave like first order systems. It is of course also possible to use also higher order models.

According to a second aspect of the invention, a computer-implemented method for controlling a temperature control mechanism is provided. The temperature control mechanism is arranged for heating of a device, comprising the steps of receiving a temperature signal, which is a measured temperature of the device, providing a first control loop mechanism which is configured to output a first predicted temperature of the gas surrounding the device, providing a second control loop mechanism which is configured to output a control signal for controlling the temperature controller, providing a first model of the thermal properties of the device, which is configured to output a modelled temperature of the device based on the first predicted temperature of the gas surrounding the device, and providing a second model of the thermal properties of the device, which is configured to predict a modelled first temperature effect of the temperature controller on the device based on the control signal. The input to the first control loop mechanism is the temperature signal from which the modelled temperature and the modelled first temperature effect have been subtracted, and wherein the input to the second control loop mechanism is the difference between the first predicted temperature of the gas surrounding the device and the temperature signal.

The computer-implemented method according to the second aspect of the invention provides the same advantages as were described in relation to the first aspect of the invention.

The computer implemented method may comprise receiving an activity signal for the device, and providing a third model of the device, which predicts a modelled second temperature effect of the device activity on the device itself based on the activity signal, wherein the input to the first control loop mechanism is provided with the temperature signal from which the modelled temperature, the modelled first temperature effect and the modelled second temperature effect have been subtracted. By taking into account also the effect of the activity of the device itself, the control of the temperature of the device is further improved, thereby minimizing the risk for frost and condensation on the device.

According to a third aspect of the present invention a computer program for controlling a temperature control mechanism is provided. The temperature control mechanism is arranged for heating of a device, comprising instructions, which when run on a computer make the computer perform the method according to the second aspect of the invention.

DETAILED DESCRIPTION

Condensation can only happen at surfaces that are below the dew point temperature of the surrounding gas. The dew point temperature is always equal to or smaller than the gas temperature. Thus, if the system (or critical surfaces of the system) is kept at a higher temperature than the surrounding gas, condensation is impossible. The same logic applies to frost.

Figure 1:
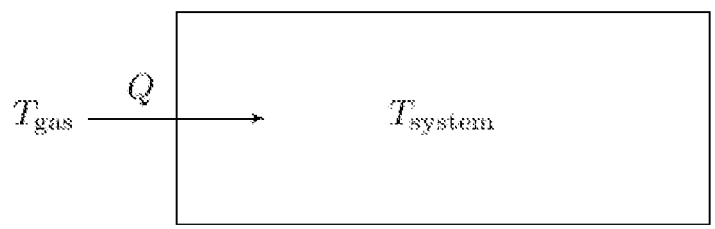
FIG. 1 is a schematic drawing of heat transfer between a system and surrounding gas.

The underlying logic of the controller is that when the temperature $T_{gas}$ of the surrounding gas changes, the temperature $T_{system}$ of the system will change as well due to the system striving for equilibrium with the surrounding gas, as illustrated in FIG. 1, but with a delay, which depends on the thermal and geometrical properties of the system. In FIG. 1 the heat transfer is illustrated by the arrow Q. FIG. 1 illustrates a fundamental physical principle, which is to be considered as prior art. By monitoring the change in the system's temperature one can infer information about changes in the temperature of the surrounding gas, from which one then can infer if there is any risk of frost or condensation. This information can be used to regulate the systems temperature through some temperature control mechanism to mitigate or remove condensate and frost. One of the challenges of designing such a controller is that when the temperature control mechanism is operating, it changes the measured system temperature.. With the temperature controller according to the present description regulation of the systems temperature is achieved to mitigate or remove condensate and frost.

In its basic form the controller only needs input from a single temperature sensor, which measures the temperature at a single point somewhere in the system. The system temperature does not need to be homogeneous. The relationship between the temperature $T_{gas}$ of the surrounding gas and the measured temperature $T_{system}$ of the system can in many circumstances be described with good accuracy by the mathematics of control theory using transfer functions.

If the gas temperature is denoted as X and the measured system temperature as Y, a transfer function S can be found which approximately describes the relationship between X and Y. This can be illustrated in a block diagram as depicted in FIG. 2.

Figure 3:
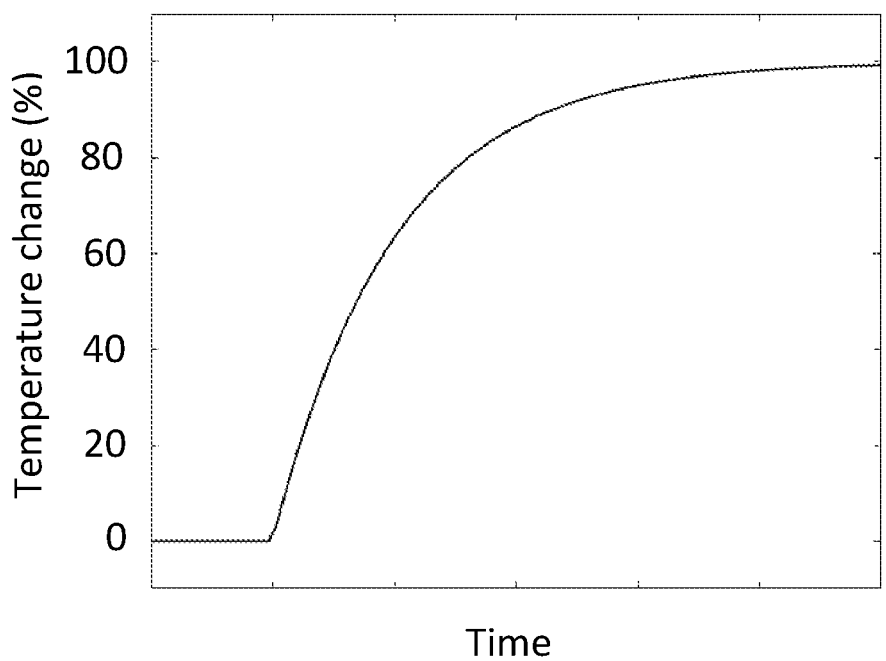
FIG. 3 is an example of the step response of a first order system, i.e., mathematically described by a first order transfer function.

The transfer function S is a mathematical description of the time-characteristics of the system and it depends on the thermal properties of the system. For most systems, a so-called first order transfer function will describe the relationship between X and Y with good accuracy. The step response (i.e. the response to an instantly changed input, which in this specific case is the gas temperature X) of such a system is shown in the graph in FIG. 3.

Figure 2:
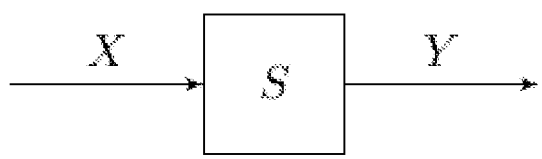
FIG. 2 is a block diagram relating the measured temperature Y to the gas temperature X through the transfer function S.

The relationship between the controllers input to the temperature control mechanism and the system temperature can also be described by a transfer function and represented in a block-diagram similar to the one in FIG. 2, although the input and the transfer function will be a different function called M in this description. This transfer function can also, for most systems, be approximated as a first order transfer function with a step response like the one shown in FIG. 3, although with a different time constant (reflecting the speed of the response).

Key components of the controller are internal models of S and M, a first model is called $\tilde{S}$ and a second model is called $\tilde{M}$. These are used to predict the gas temperature X and to compensate for the effects of the temperature control mechanism, respectively for $\tilde{S}$ and $\tilde{M}$. The characteristics of S and M need to be measured for the system and then modelled in $\tilde{S}$ and $\tilde{M}$. Many different (common) methods can be used to characterize S and M through measurements, for example by studying the step-change response of the system to changes in the environment temperature and the temperature control mechanism's control signal for S and M, respectively.

The models $\tilde{S}$ and $\tilde{M}$ may be first order models. In order to define such first order models one may exposes the system, without the controller, to a step change in the input and measure the response, for example by measuring the time Tau to reach 63.2% of the change in output. One time constant will be measured for each model. For the model $\tilde{S}$, this means changing the environment temperature and measuring the change in system temperature. For the model $\tilde{M}$ this means changing the heater control signal and measuring the change in system temperature.

The models should be first-order systems with these time constants Tau. The most likely implementations of the models are as computer models. There are many different computer models that behave like first order systems.

Figure 4:
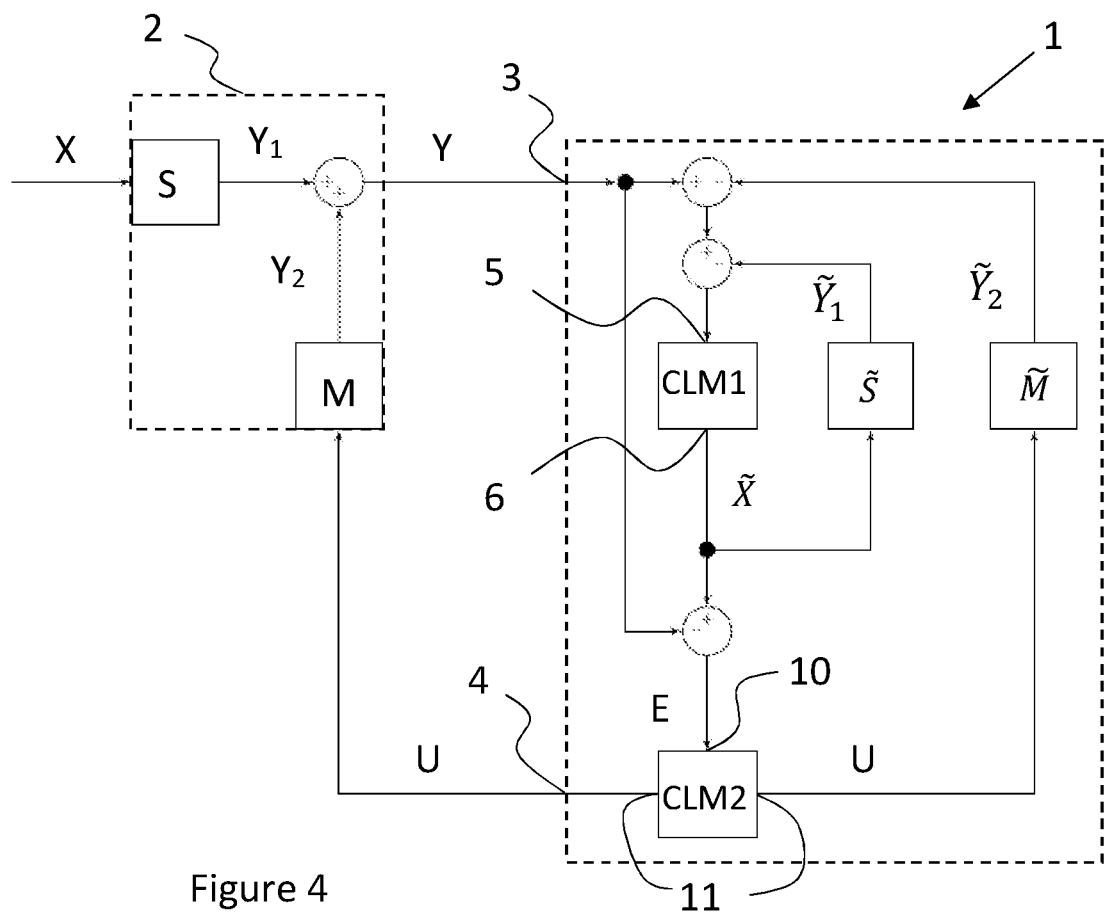
FIG. 4 is a block diagram of a temperature controller according to an embodiment of the invention.

One or more of the internal controller models S and M can in principle be realized as any physical or simulated system which behave mathematically similar to S and M. Physical models could be based on, for example, electrical circuits (e.g. a simple RC circuit which can also be described as a first order system) or even thermoelectrical or thermomechanical devices. One or more of the models may also be implemented as computer models. FIG. 4 illustrates a temperature controller 1 for a temperature control mechanism M arranged for heating of a device 2. The temperature controller 1 comprises an input 3 for a temperature signal Y, which is a measured temperature of the device 2, an output 4 for a control signal U for controlling the temperature controller, and a first control loop mechanism CLM1, comprising an input 5 and an output 6, wherein the first control loop mechanism CLM1 is configured to output a first predicted temperature $\tilde{X}$ of the gas surrounding the device. The temperature controller 1 also comprises a first model $\tilde{S}$ of the thermal properties of the device 2, which is configured to output a modelled temperature $\tilde{Y}_1$ of the device based on the first predicted temperature $\tilde{X}$ of the gas surrounding the device, a second model $\tilde{M}$ of the thermal properties of the device, which predicts a modelled first temperature effect $\tilde{Y}_2$ of the temperature controller on the device based on the control signal U, and a second control loop mechanism CLM2, comprising an input 10 and an output 11, wherein the second control loop mechanism CLM2 is configured to output the control signal U. The input 5 of the first control loop mechanism CLM1 is provided with the temperature signal Y from which the modelled temperature $\tilde{Y}_1$ and the modelled first temperature effect $\tilde{Y}_2$ have been subtracted, and wherein the input of the second control loop mechanism is provided with the difference between the first predicted temperature $\tilde{X}$ of the gas surrounding the device and the temperature signal Y.

In FIG. 4, the different signals are as follows. X represents the input of the surrounding gas temperature, which is unknown and unmeasured. S is the system's transfer function, which relates the gas temperature to the system's temperature. When X changes, the system's temperature also changes with delay and distortion described by the transfer function S. $Y_1$ represents the contribution to the system's total temperature due to the gas temperature. U represents the control signal given to the temperature control mechanism. M is the system's transfer function, which relates the temperature control mechanism's output to the system's temperature. $Y_2$ represents the contribution to the system's total temperature due to the temperature control mechanism. Y is the system's total temperature, which is measured at one location through the single temperature sensor.

Inside the temperature controller the signals are as follows. $\tilde{X}$ represents the controller's predicted gas temperature. It is used to decide if the temperature control mechanism should be engaged. The controller strives to bring the system's temperature Y up to $\tilde{X}$, effectively preventing condensate and frost from forming (since we know that the dew/frost point temperature will be lower than the environment temperature X which is predicted by $\tilde{X}$). E is the error signal, i.e. the difference between the desired temperature $\tilde{X}$ and the actual measured temperature Y, which the controller strives to minimize through the temperature control mechanism. Thus, the controller CLM2 is configured to minimize the signal on the input, i.e., the error signal. $\tilde{S}$ is the controller's internal model of the system's transfer function S which is needed to predict X through $\tilde{X}$. The first control loop mechanism CLM1 is used to minimize the difference between $\tilde{X}$ and X, based on the model $\tilde{S}$ of the thermal properties of the system, i.e., the first control loop mechanism CLM1 is configured to minimize the signal on the input 5. In other words, the prediction $\tilde{X}$ is driven towards X. The model parameters for $\tilde{S}$, which are essential for a good prediction $\tilde{X}$, are measured for the system before the implementation of the controller. $\tilde{M}$ is the controller's internal model of the system's transfer function M. This is needed because the temperature control mechanism influences the measured temperature Y, so the contributions of the temperature control mechanism and of the environment on the measured temperature need to be separated. Fortunately, the controller has direct (internal) access to the control signal U, so the effects of the temperature control mechanism on the temperature Y can be predicted and subtracted by using $\tilde{M}$. The model parameters can be measured for the system once the temperature controller and temperature control mechanism are implemented A few things should be noted. Although S, M, $\tilde{S}$ and $\tilde{M}$ can be modelled by first-order transfer function for most systems, it is possible to use higher order transfer functions as well. The exact forms of S and M (and thus $\tilde{S}$ and $\tilde{M}$) depend on the physical location of the single temperature sensor (as well as the thermal properties of the system). The controller relies on two internal control loop mechanisms, which need to be tuned for stability of the whole system. At least one of the first control loop mechanism CLM1 and the second control loop mechanism CLM2 may be implemented as a proportional—integral—derivative, PID, controllers, fuzzy logic controllers or machine learning controllers. In most applications, the temperature control mechanism puts limits on the input U and the output $Y_2$. However, one only needs to ensure that the system temperature Y is greater than or equal to the environment temperature X, so the output of the controller U to the temperature control mechanism can be limited without loss of the core functionality. The control system relies on the assumption of linearity of the whole system. This is an approximation that works for most systems, operating conditions, and temperatures. At least one of the P, I, and D-terms of a PID controller may be zero. Usually, the D-term, i.e., the differential part is zero. This results in a so called PI controller.

Figure 5:
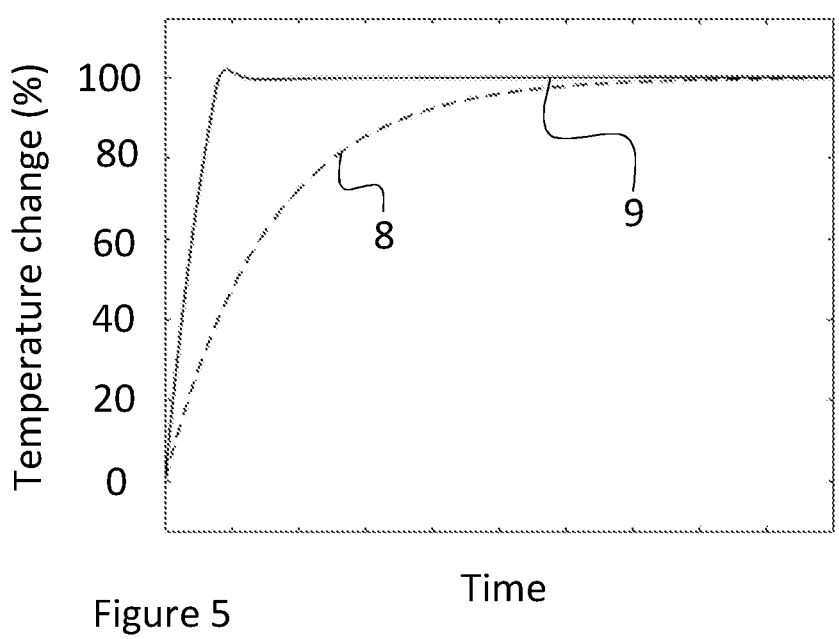
FIG. 5 shows the temperature response using the temperature controller in FIG. 4.

A simulation of a system's normalized response to a step change in the environment's temperature is shown in FIG. 5. The dashed line 8 is the system response without the temperature controller 1. The solid line 9 is the system response with the temperature controller 1. Condensate or frost can form whenever the system's temperature is lower than the unknown dew point temperature. Without the temperature controller, the system will thermalize slowly with the new environment, as in FIG. 3 earlier, leaving room for condensation or frost. With the temperature controller implemented, however, the system rapidly reaches the same temperature as the environment rendering it impossible for new condensate and frost to form. Here one can note that:

In many applications, the system generates heat by self-heating through its normal operation which will keep the system's temperature slightly above the environment temperature in equilibrium. This self-heating helps the condensation and frost mitigation system.

It is possible to implement a temperature safety margin by biasing the controller's input, i.e., the temperature reading.

There is still a delay in the temperature response of the system, so some systems could, in extreme cases, where the environment temperature change is too rapid or the self-heating is insufficient, still be vulnerable to condensate or frost for short amounts of time. The invention still significantly reduces the amount of frost and condensate in these situations, although it does not prevent it from forming completely. Sometimes these situations can be handled by proper choice of temperature control mechanism, through moving the temperature sensor, through modifying the thermal properties of the system, through use of heat sinks or thermal conductors, or through the use of passive dehumidifiers, i.e., non-critical surfaces acting as moisture traps for the frost and condensate to form on.

Some systems have a variability in the self-heating due to variability in the system's operation. This is true for almost any system which has significant variability in power consumption. In systems where there is a significant variability in self-heating, this needs to be accounted for in the operation of the controller. In this case, some sort of measurement of the system's activity has to be input into the controller. There are many different kinds of measurements that can be used for this purpose, depending on the application. For example, the total power consumed by the system could be monitored, or, when applicable, the CPU load could be used as input.

In FIG. 6A represents the measured activity level. W is the system's transfer function that relates the system's activity level to the system's temperature. $Y_0$ represents the contribution to the system temperature due to its activity, i.e. self-heating due to the system performing work. A third model $\tilde{W}$ represents the controller's internal model of the system's transfer function W. The model parameters for $\tilde{W}$ needs to be measured and/or characterized for the system. Both W and $\tilde{W}$ can in most applications be modelled with first order transfer functions, although higher order transfer functions are possible. In order to define a first order model as the third model $\tilde{W}$ one may exposes the system, without the controller, to a step change in the input and measure the response, for example by measuring the time Tau to reach 63.2% of the change in output. For the model $\tilde{W}$, this means changing the activity signal, such as the system input current, excluding the heater.

Figure 6:
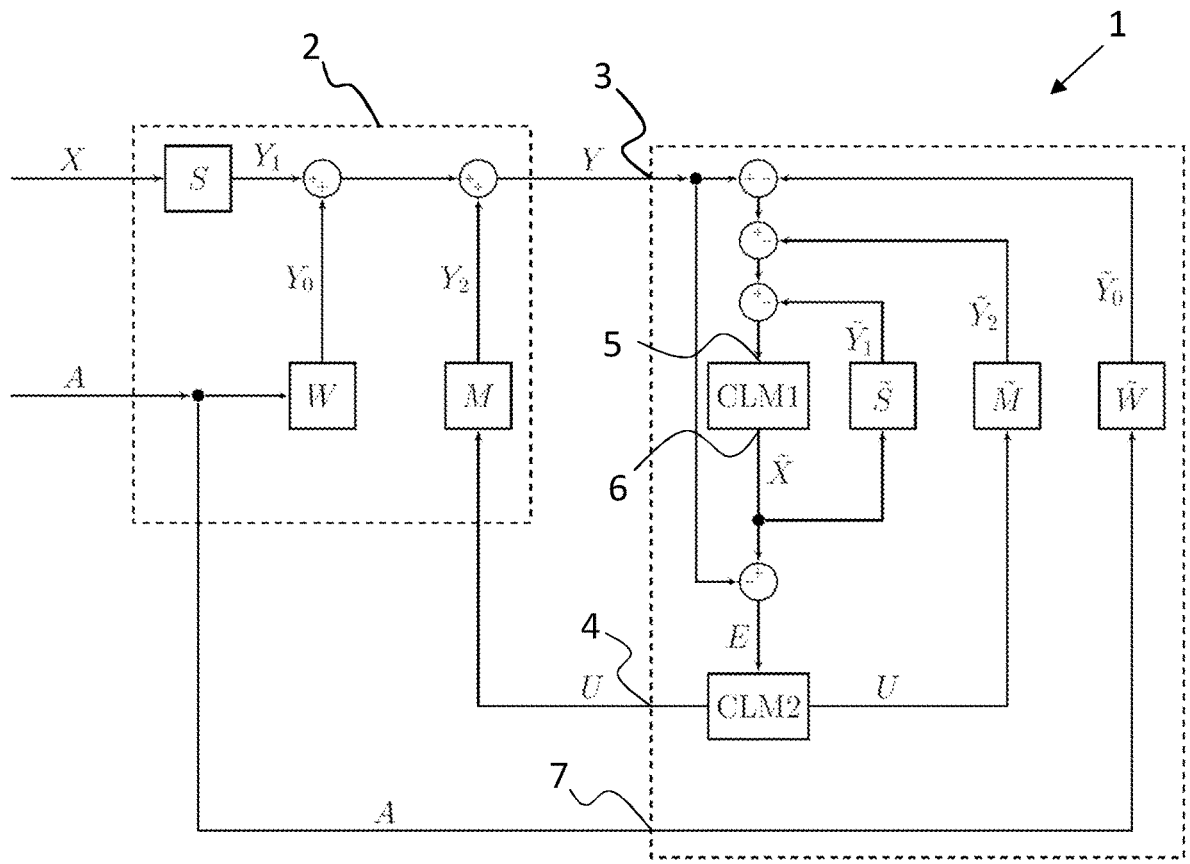
FIG. 6 is a block diagram of a temperature controller according to an alternative embodiment of the invention.

The controller 1 in FIG. 6 comprises a second input 7 for the activity signal A of the device, and a third model $\tilde{W}$ of the device, which predicts a modelled second temperature effect $\tilde{Y}_3$ of the device activity on the device itself based on the activity signal A. With such a temperature controller the temperature control is more efficient as heating does not have to be applied when the activity of the device 2 is high.

The temperature controller may be implemented with a computer which executes a program for implementing the temperature controller on the computer.

A computer implemented method for controlling a temperature control mechanism, which temperature control mechanism is arranged for heating of a device 2, comprises the steps of receiving a temperature signal Y, which is a measured temperature of the device, and providing a first control loop mechanism which is configured to output a first predicted temperature $\tilde{X}$ of the gas surrounding the device. The method also comprises the steps of providing a second control loop mechanism which is configured to output a control signal U for controlling the temperature controller, providing a first model $\tilde{S}$ of the thermal properties of the device, which is configured to output a modelled temperature $\tilde{Y}_1$ of the device based on the first predicted temperature $\tilde{X}$ of the gas surrounding the device, and providing a second model $\tilde{M}$ of the thermal properties of the device, which is configured to predict a modelled first temperature effect $\tilde{Y}_2$ of the temperature controller on the device based on the control signal U, wherein the input to the first control loop mechanism CLM1 is the temperature signal Y from which the modelled temperature $\tilde{Y}_1$ and the modelled first temperature effect $\tilde{Y}_2$ have been subtracted, and wherein the input of the second control loop mechanism is the difference between the first predicted temperature $\tilde{X}$ of the gas surrounding the device and the temperature signal Y.

The method may also comprise receiving an activity signal A for the device 2, and providing a third model $\tilde{W}$ of the device, which predicts a modelled second temperature effect $\tilde{Y}_3$ of the device activity on the device itself based on the activity signal A, wherein the input to the first control loop 5 mechanism is provided with the temperature signal Y from which the modelled temperature $\tilde{Y}_1$, the modelled first temperature effect $\tilde{Y}_2$ and the modelled second temperature effect $\tilde{Y}_3$ have been subtracted.

Figure 7:
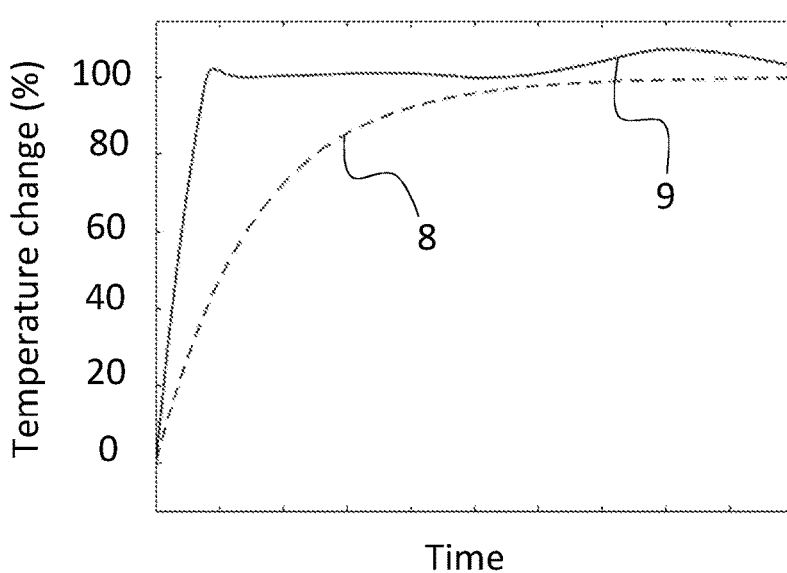
FIG. 7 shows the temperature response using the temperature controller in FIG. 6.

An example of a simulation of a system's normalized response to a step change in the environment's temperature with variability in self-heating is shown in FIG. 7. The dashed line 8 is the system response without the temperature controller 1. The solid line 9 is the system response with the temperature controller 1.

To summarize, a controller capable of preventing and removing condensation and frost through a temperature control mechanism using a single temperature measurement and an optional measurement of the system's activity level has been described. The controller internally compensates for the effects of the temperature control mechanism and the activity level of the system through internal models of the system, which removes the need for additional inputs. The internal models can be realized in many different forms, both through physical models, e.g., circuits, thermoelectrical or thermomechanical devices, or through computer models, as long as the model behaves mathematically similar to the system in question, i.e., it has a similar transfer function. Furthermore, the controllers internal control loop mechanisms can be realized in many forms, e.g., as PID-controllers, fuzzy logic controllers and machine learning controllers.

It is obvious to persons skilled in the art that numerous additions, subtractions, and modifications of the described controller are possible without departing from the scope of the invention, which is defined by the appended claims. There are, for example, many kinds of temperature control mechanisms, or combinations thereof, that can be used together with the controller. Some examples are use of heaters, fans, Peltier elements, heat exchangers, heat rods, heat sinks, etc. The necessary condition for preventing condensation or frost is that the critical surfaces are at a higher temperature than the dew or frost point temperature. The temperature control mechanism can work through heating, direct or indirect, of critical surfaces. The controller can also be modified to work through lowering the dew or frost point temperature of the gas as well, cooling and/or dehumidifying the gas. It could even be modified to use a combination of these different techniques, raising the temperatures of the critical surfaces and lowering the dew or frost point temperature of the gas.

The invention claimed is:

1. A temperature controller for a temperature control mechanism (M) arranged for heating of a device, which temperature controller is configured to receive an input for a temperature signal (Y) corresponding to a measured temperature of the device and generate a control signal (U) for the temperature control mechanism, wherein the temperature controller comprises:
   a first controller (CLM1) configured to receive an input and generate an output including a first predicted temperature ($\tilde{X}$) of the gas surrounding the device,
   a first circuit ($\tilde{S}$) configured to model thermal properties of the device, wherein the first circuit ($\tilde{S}$) is configured to output a modelled temperature ($\tilde{Y}_1$) of the device based on the generated first predicted temperature ($\tilde{X}$) of the gas surrounding the device,
   a second circuit ($\tilde{M}$) configured to model thermal properties of the device, which the second circuit ($\tilde{M}$) is configured to predict a modelled first temperature effect ($\tilde{Y}_2$) of the temperature controller on the device based on the control signal (U), and
   a second controller (CLM2) configured to output the control signal (U),
   wherein the input of the first controller (CLM1) includes the temperature signal (Y) from which the modelled temperature ($\tilde{Y}_1$) and the modelled first temperature effect ($\tilde{Y}_2$) have been subtracted, and
   wherein the input of the second controller (CLM2) includes the difference between the first predicted temperature ($\tilde{X}$) of the gas surrounding the device and the temperature signal (Y).

2. The temperature controller according to claim 1, wherein at least one of the first controller (CLM1) and the second controller (CLM2), is implemented as a proportional—integral—derivative, PID, controller.

3. The temperature controller according to claim 2, wherein at least one of the P, I, and D-terms of a PID controller is zero.

4. The temperature controller according to claim 1, wherein at least one of the controllers is implemented as a fuzzy logic controller.

5. The temperature controller according to claim 1, wherein at least one of the controllers is implemented as a machine learning controller.

6. The temperature controller according to claim 1, wherein some or all of the properties of the first circuit ($\check{S}$) $\tilde{Y}_1$ $\tilde{X}$ is implemented with a computer model.

7. The temperature controller according to claim 1, wherein the first circuit ($\check{S}$) $\tilde{Y}_1$ $\tilde{X}$ is an electrical circuit.

8. The temperature controller according to claim 1, wherein some or all properties of the second circuit $\tilde{M}$ $\tilde{Y}_2$ is implemented with a computer model.

9. The temperature controller according to claim 1, wherein the second circuit (M) of the thermal properties of the device, which predicts a modelled first temperature effect ($Y_2$) of the temperature controller on the device based on the control signal (U), is modelled through a physical model is an electrical circuit, a thermomechanical system or a thermoelectrical system.

10. The temperature controller according to claim 1, comprising a second input for an activity signal (A) of the device, and a third circuit ($\check{W}$) of the device, which predicts a modelled second temperature effect ($\tilde{Y}_3$) of the device activity on the device itself based on the activity signal (A), wherein the input to the first controller (CLM1) is provided with the temperature signal (Y) from which the modelled temperature ($\tilde{Y}_1$), the modelled first temperature effect ($\tilde{Y}_2$) and the modelled second temperature effect ($\tilde{Y}_3$) have been subtracted.

11. The temperature controller according to claim 1, comprising a computer which executes a program for implementing the temperature controller on the computer.

12. A computer implemented method for controlling a temperature controller, configured to heat a device, the method comprising:

receiving a temperature signal (Y) corresponding to a measured temperature of the device, outputting a first predicted temperature ($\tilde{X}$) of the gas surrounding the device, outputting a control signal (U) for controlling the temperature controller, outputting a modelled temperature ($\tilde{Y}_1$) of the device based on the first predicted temperature ($\tilde{X}$) of the gas surrounding the device and thermal properties of the device, and predicting a modelled first temperature effect ($\tilde{Y}_2$) of the temperature controller on the device based on the control signal (U) and the thermal proerties of the device, wherein the first predicted temperature is based on the temperature signal (Y) from which the modelled temperature ($\tilde{Y}_1$) and the modelled first temperature effect ($\tilde{Y}_2$) have been subtracted, and wherein the control signal is based on the difference between the first predicted temperature ($\tilde{X}$) of the gas surrounding the device and the temperature signal (Y).

13. The computer implemented method for controlling according to claim 12, wherein the method comprises receiving an activity signal (A) for the device (2), and providing a third circuit ($\check{W}$) of the device, which predicts a modelled second temperature effect ($\tilde{Y}_3$) of the device activity on the device itself based on the activity signal (A), wherein the input (5) to the first controller (CLM1) is provided with the temperature signal (Y) from which the modelled temperature ($\tilde{Y}_1$), the modelled first temperature effect ($\tilde{Y}_2$) and the modelled second temperature effect ($\tilde{Y}_3$) have been subtracted.

14. A non-transitory computer storage medium comprising instructions, which when run on a computer makes the computer perform the method according to claim 12.

* * * * *

UNITED STATES PATENT AND TRADEMARK OFFICE
CERTIFICATE OF CORRECTION

| | |
|---|---|
| PATENT NO. | : 11,913,662 B2 |
| APPLICATION NO. | : 18/249363 |
| DATED | : February 27, 2024 |
| INVENTOR(S) | : Gustav Bohlin |

It is certified that error appears in the above-identified patent and that said Letters Patent is hereby corrected as shown below:

In the Specification

In Column 5, Line 46, delete "temperature.." and insert --temperature.--.

In Column 7, Line 57, delete "implemented" and insert --implemented.--.

In the Claims

In Column 10, Claim 1, Line 32, delete "which" and insert --wherein--.

In Column 10, Claim 1, Line 47, delete "which" and insert --wherein--.

In Column 11, Claim 12, Line 36 (Approx.), delete "controller," and insert --controller--.

In Column 12, Claim 12, Line 13 (Approx.), delete "proerties" and insert --properties--.

Signed and Sealed this
Fifteenth Day of October, 2024

*Katherine Kelly Vidal*

Katherine Kelly Vidal
*Director of the United States Patent and Trademark Office*